United States Patent Office 3,431,053
Patented Mar. 4, 1969

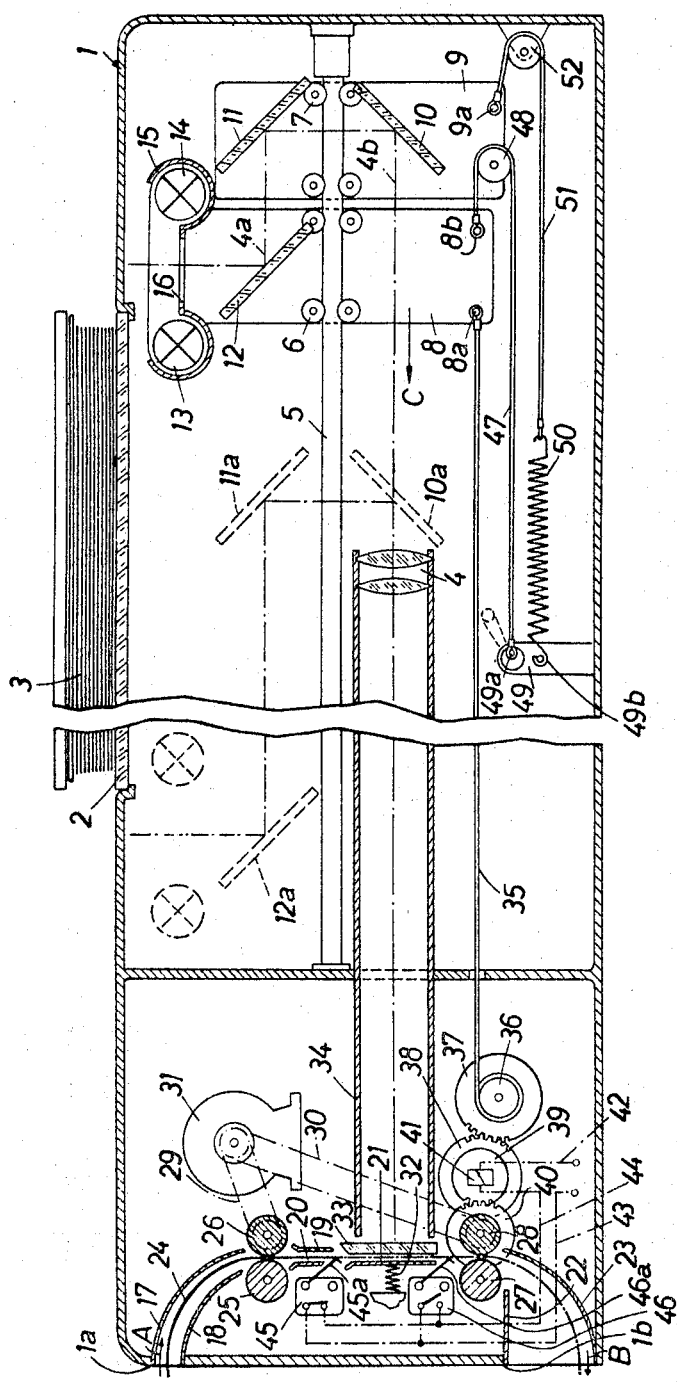

3,431,053
OPTICAL COPYING APPARATUS
Richard Wick, Grunwald, near Munich, Fritz Waschk, Munich, and Jurgen Orthmann, Grunwald, near Munich, Germany, assignors to AGFA-Gevaert Aktiengesellschaft, Leverkusen, Germany
Filed Oct. 14, 1965, Ser. No. 495,904
Claims priority, application Germany, Oct. 24, 1964, A 47,429
U.S. Cl. 355—66    15 Claims
Int. Cl. G03b 27/70

ABSTRACT OF THE DISCLOSURE

An optical copying apparatus wherein the admission of a photosensitive sheet results in energization of a clutch for two reflectors which deflect images of successive zones of a stationary subject into a lens so that the lens focusses the images on the travelling carrier. One of the reflectors travels at half the speed of the other reflector and the reflectors automatically return to starting positions on completion of an exposure.

---

The present invention relates to optical copying apparatus in general, and more particularly to improvements in optical copying apparatus of the type wherein the image of a stationary subject is transmitted to the photosensitised surface of a moving carrier.

In optical copying of documents, the subject is preferably placed onto a stationary support. A stationary document is less likely to be damaged and, furthermore, such method renders it possible to make copies of book pages, magazine pages and similar subjects which, as a rule, cannot be readily separated or detached without destroying the book.

It was also found that the transmission of images from a stationary subject to a stationary sheet of photosensitive material necessitates the provision of strong illuminating devices and expensive equipment which insures that all zones of the subject are illuminated to the same degree. Also, optical copying apparatus which transfer images of stationary subjects onto stationary carrier sheets must be equipped with expensive wide-angle objectives.

Proposals to avoid the drawbacks of the just outlined conventional optical copying apparatus include the provision of objectives which travel with reference to and transmit images of consecutive zones of a stationary subject to a travelling sheet of photosensitive material. Such proposals have met with limited success because the length of the optical path varies so that the picture is sharp only when the objective assumes a single predetermined position. Also, the apparatus is too bulky, particularly in a direction at right angles to the plane of the subject.

Accordingly, it is an important object of the present invention to provide a very simple, compact and reliable optical copying apparatus wherein the subject may be placed onto a stationary support and wherein the copying operation requires very little time.

Another object of the invention is to provide an optical copying apparatus of the just outlined characteristics wherein the carrier of photosensitive material can travel continuously to thus reduce the copying time and wherein the objective may be mounted on a stationary part.

A further object of the invention is to provide an optical copying apparatus wherein a moving carrier of photosensitive material receives images of consecutive zones of a subject and wherein scanning of such consecutive zones does not affect the sharpness or other desirable characteristics of the reproductions.

An additional object of the invention is to provide an apparatus wherein all movable parts of the image transmitting unit automatically assume their starting positions as soon as the transmission of images of a given subject is completed so that the apparatus is ready to make the next copy.

Briefly stated one feature of our present invention resides in the provision of an apparatus for optical copying of printed matter, pictures or the like. The apparatus comprises stationary supporting means for positioning the subject in a predetermined plane, first reflector means movable past the subject in substantial parallelism with the plane of the subject for transmitting images of consecutive zones of the subject in a first path which is substantially parallel to the aforementioned plane, second reflector means also movable in parallelism with such plane for deflecting the images from the first path into a second path wherein the direction of transmission is counter to that in the first path, a feed for conveying sheets or other carriers of photosensitive material across the path of images transmitted by the second reflector means, and advancing means for moving the first and second reflector means in the same direction and at first and second speeds respectively. The advancing means preferably receives motion from the feed for the carriers of photosensitive material and the speed of the second or trailing reflector means preferably equals or at least approximates half the speed of the first or leading reflector means so that the distance between the two reflector means increases gradually and at a fully controlled rate when the advancing means is operated by the feed.

The advancing means may comprise a tackle which connects the two reflector means and which causes the trailing reflector means to travel at half the speed of the leading reflector means. The apparatus further comprises a preferably fixed objective which focusses images transmitted by the second reflector means onto consecutive portions of the travelling carrier, and means for automatically returning the reflector means to their respective starting positions.

The novel features which are considered as characteristic of the invention are set forth in particular in the appended claims. The improved copying apparatus itself, however, both as to its construction and its mode of operation, together with additional features and advantages thereof, will be best understood upon perusal of the following detailed description of a specific embodiment with reference to the accompanying drawing, the singe illustration of which is a longitudinal vertical section through an apparatus embodying the present invention.

Referring to the drawing in detail, there is shown an optical copying apparatus which comprises a casing or housing 1 whose top wall is formed with a cutout for a transparent pane 2 serving as a stationary means for supporting and positioning a subject 3, for example, a book, one page of which is held flat against the upper side of the pane 2 so that the selected page is located in a substantially horizontal plane.

The interior of the housing 1 accommodates a fixed objective 4 having a horizontal optical axis, i.e., this axis is parallel to the plane of the supporting pane 2. A horizontal guide rail 5 is mounted in the housing 1 and serves to support two wheel-mounted slides or carriages 8 and 9. The carriages 8, 9 are reciprocable in parallelism with the plane of the pane 2 and in directions which are parallel to the optical axis of the objective 4. These carriages are respectively provided with rollers or wheels 6 and 7 which travel along the rail 5.

The trailing carriage 9 supports a reflector means including a pair of suitably inclined mirrors 10 and 11 the former of which serves to deflect images of consecutive zones of the subject 3 into a horizontal path 4b so that the objective 4 focuses the images onto a carrier sheet 24 of photosensitive material which is fed across the path 4b. The objective 4 is fixedly mounted between the carrier 24 and the mirror 10. The mirror 11 deflects images from a horizontal path 4a and against the surface of the mirror 10. It will be noted that the transmission of images in the path 4a is directly counter to that in the path 4b so that the mirrors 10, 11 together effect a deflection through an angle of exactly 180 degrees.

The carriage 8 supports a reflector means including a single mirror 12 which transmits images of consecutive zones of the subject 3 into the path 4a, i.e., against the surface of the mirror 11. It will be noted that the surface of the mirror 12 deflects light rays which are reflected by the surface of the subject 3 and directs them into a path (4a) which is parallel with the plane of the pane 2 and with the path 4b.

The carriage 8 further supports an illuminating device including two mirror symmetrical light sources 13, 14 surrounded by a light reflecting shield 15. The light sources 13, 14 resemble elongated tubes and extend across the full width of the pane 2. The light rays directed by the sources 13, 14 and shield 15 against a given zone of the subject 3 are reflected onto the mirror 12 through the opening of a diaphragm 16 mounted on the carriage 8 in the space between the pane 2 and mirror 12. The opening of the diaphragm 16 extends all the way across the pane 2, i.e., the direction of elongation of this opening is at right angles to the plane of the drawing. This diaphragm prevents stray light from reaching the mirror 12.

The left-hand side wall of the housing 1 is formed with an inlet 1a and an outlet 1b. Suitably distributed guide plates or baffles 17–23 are mounted in the interior of the housing 1 to define between themselves an arcuate passage in which sheets 24 of photosensitive material may be fed in a direction from the inlet 1a toward the outlet 1b and across the path of images which are deflected by the mirror 10 on the carriage 9. The sheets 24 may be admitted by hand as indicated by the arrow A and are then engaged and entrained by a feed which includes two pairs of cooperating feed rollers 25, 26 and 27, 28. The sheet issuing from the gap between the second pair of rollers 27, 28 is discharged through the outlet 1b as indicated by an arrow B.

The feed further includes an electric motor 31 serving to drive two endless elastic belts 29, 30 which are respectively trained around the rollers 26, 28. The centrally located guide plate 21 is biased by a spring 32 to press the adjoining portion of the sheet 24 against a transparent stop 33 in the form of a plate which insures that the sheet is held flat during travel past the rear end of an elongated opaque tube 34 whose front end carries the objective 4.

The advancing means for moving the carriages 8, 9 from the starting positions shown in the drawing and in a direction which is parallel with the paths 4a, 4b comprises a transmission which includes a winch arranged to receive motion from an electromagnetic clutch 41. The winch comprises a reel 36 which is rigid with a gear 37 and is connected with one end of a flexible element here shown as a cable 35. The other end of the cable 35 is attached to the front carriage 8, as at 8a. The gear 37 meshes with a gear 38 which constitutes the driven member of the clutch 41. The driver member 39 of the clutch 41 also resembles a gear which meshes with a gear 40 coaxially fixed to the driven feed roller 28. When the clutch 41 is energized, it couples the gear 38 for rotation with the gear 39 whereby the gear 38 drives the gear 37 and the reel 36 is rotated in a counterclockwise direction, i.e., in a sense to take up the cable 35 and to thereby move the carriage 8 in the direction indicated by an arrow C.

The clutch 41 is connected with a source of electrical energy (see the conductor 32) and with a pair of microswitches 45, 46 whose sensing elements or detectors 45a, 46a extend into the path of sheets 24 to respectively complete and open the circuit of the clutch. The connection between the clutch 41 and switches 45, 46 comprises conductors 43, 44. The arrangement is such that the switch 45 completes the circuit of the clutch 41 to start the advancing means for the carriages 8, 9 when the sensing element 45a is engaged by a freshly admitted sheet 24. The sheet then engages the sensing element 46a to close the switch 46 which is connected in parallel with the switch 45. The circuit of the clutch 41 is opened when the sheet 24 moves beyond the sensing element 46a.

The aforementioned advancing means further comprises a second transmission which connects the carriage 9 for movement with the carriage 8 in response to winding of cable 35 onto the reel 36. This second transmission comprises a tackle which is arranged to move the carriage 9 at a speed which equals or at least approximates half the speed of the carriage 8. The tackle includes a second flexible element or cable 47 which is trained around a pulley or sheave 48 provided on the carriage 9. One end of the cable 47 is secured to a pin 8b on the carriage 8, and its other end is fixed to a stationary holder or bracket 49 provided in the housing 1. The connection between the cable 47 and the bracket 49 includes an adjusting device in the form of an eccentric 49a which may be turned by hand to change the effective length of the cable 47 and to thereby regulate the initial distance between the carriages 8 and 9. Thus, each angular position of the adjusting device 49a corresponds to a different distance between the carriages. Such adjustments are necessary to control the sharpness of copies. The positions of the pin 8b and adjusting device 49a may be reversed. It is also possible to make the pulley 48 adjustable with reference to the carriage 9 and to omit the device 49a.

The apparatus further comprises means for permanently biasing the carriages 8 and 9 to their respective starting positions. In the illustrated embodiment, the biasing means comprises a flexible cable 51 which is trained around a pulley 52 mounted on a bracket of the housing 1. One end of the cable 51 is attached to a pin 9a on the carriage 9 and the other of its ends is secured to a helical return spring 50 which is connected to a pin 49b on the bracket 49. It is evident that the spring 50 automatically returns both carriages to their respective starting positions as soon as the clutch 41 is deenergized so that the bias of the spring 50 causes the reel 36 to pay out the cable 35.

The operation of the improved copying apparatus is as follows:

The subject 3 is placed onto the transparent pane 2 in such a way that the surface which is to be photographed faces downwardly. The motor 31 is started to drive the rollers 26, 28 through the intermediary of the belts 29, 30. The operator then admits a sheet 24 of photosensitive material through the inlet 1a so that the leading end of the sheet passes between the guide plates 17, 18 and enters the gap between the upstream rollers 25, 26. From then on, the feed automatically entrains and advances the sheet 24 through the remainder of the passage defined by the guide plates 17–23 whereby the leading end of the sheet trips the sensing element 45a to complete the circuit of the clutch 41 via switch 45 and to start the advancing means for the carriages 8 and 9. After moving past and beyond the sensing element 45a, the sheet 24 is caused to advance between the spring-biased guide plate 21 and the transparent plate 33 so that its light sensitive material is exposed to light rays travelling in the tube 34. The sensing element 45a is located immediately upstream of the plate 21 so that carriages 8, 9 are set in motion at the time the sheet 24 begins to move behind the stop plate 33. Such movement of the carriages is effected by the cable 35 which is being taken up by the reel 36, and by the cable 47 which is trained around the pulley 48 of the rear carriage 9. The speed of the carriage 8 is twice the speed of the carriage 9. The spring 50 stores energy in response to movement of carriages from their respective starting positions and the carriages advance toward the objective 4 (arrow C) so that the mirrors 10–12 ultimately assume the broken-line positions 10a, 11a, 12a. The mirror 12 deflects images of consecutive zones of the subject 3 into the path 4a which is parallel to the plane of the pane 2, and the thus transmitted images are then deflected into the path 4b. The light sources 13 and 14 illuminate such zones of the subject whose images are reflected onto the mirror 12 of the front carriage 8.

The lengthening of the path 4a in response to increasing distance between the carriages 8 and 9 is fully compensated for by a reduction in the combined length of the paths 4a, 4b. The setting of the optical system for sharpness remains unchanged despite the fact that the carriages 8 and 9 travel toward the objective 4. The ratio of the speed of the sheet 24 to the speed of the carriage 8 is selected in such a way that it corresponds to the optical picture scale. For example, if the speed of the sheet 24 (in response to movement imparted by the feed rollers 25–28) is the same as the speed of the carriage 8, the picture on the sheet 24 is free of any blurred zones and is equally sharp in all sections of the copy. Furthermore, and since the distance between the pane 2 and the illuminating means 13–15 remains unchanged, all zones of the subject are illuminated with the same intensity.

As stated before, the broken lines 10a–12a respectively indicate the final positions of the mirrors 10–12. When the carriages 8 and 9 move the mirrors to the positions 10a–12a, the trailing end of the sheet 24 passes beyond the sensing element 46a of the second switch 46 so that the latter opens the circuit of the clutch 41 and the gear 38 is free to rotate with reference to the gear 39. This enables the spring 50 to automatically retract the carriages 8 and 9 to their respective starting positions. The switch 45 opens ahead of the switch 46 but the circuit of the clutch 41 remains completed until after the sheet 24 moves beyond the sensing element 46a because the two switches are connected in parallel.

The copying apparatus which is shown in the drawing is illustrated as a separate unit. However, this apparatus can be readily combined with other apparatus which treat the sheets 24 after they emerge from the outlet 1b. For example, the feed may be arranged to advance the sheets from a loading station, through the passage defined by the baffles 17–23, and thereupon through a developing tank or the like. This results in a considerable reduction of the time necessary to produce a finished print because a fresh sheet 24 may be loaded into the apparatus when a second sheet passes behind the stop plate 33 and while a further sheet advances through the developing solution. In other words, the apparatus of the present invention may be incorporated in a complete electrophotographic copying machine, in a machine for carrying out a silver salt diffusion process or the like.

If desired, the objective 4 may be mounted on and then travels with the carriage 8. A fixed objective is normally preferred because the dimensions of the housing can be reduced.

A very important advantage of the improved copying apparatus is that all of its parts may be accommodated in a housing of small height. This is due to the fact that the carriages 8 and 9 are reciprocable in parallelism with the plane in which the subject 3 is held during scanning by the mirror 12. It is clear that, if desired, the carriages 8 and 9 may be moved by an advancing mechanism which may receive motion from a prime mover other than the motor 31 of the feed for the sheets 24. However, the arrangement which is shown in the drawing has been found to be very reliable, simple and inexpensive. It is further clear that the means for returning the carriages to their starting positions may comprise two or more springs 50 or equivalent biasing means.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In an optical copying apparatus, stationary supporting means for positioning a subject in a predetermined plane; first reflector means movable past the subject in substantial parallelism with said plane for transmitting images of consecutive zones of the subject in a first path which is substantially parallel to said plane; second reflector means movable in substantial parallelism with said plane for deflecting the images from said first path into a second path wherein the direction of transmission is substantially counter to that in said first path; a feed for conveying carriers of photosensitive material across the path of images transmitted by said second reflector means; and advancing means for moving said first and second reflector means in the same direction and at first and second speeds respectively, said second speed being less than said first speed, said feed comprising a drive which transmits motion to said advancing means and said drive including means operative to start said advancing means in response to admission of a carrier into said feed.

2. A structure as set forth in claim 1, wherein said second speed equals half the first speed and wherein said feed comprises a drive which transmits motion to said advancing means.

3. A structure as set forth in claim 1, further comprising guide means extending in parallelism with said plane, a carriage mounted on said guide means and supporting said first reflector means, said carriage being operatively connected with said advancing means to move along the guide means at said first speed, and subject illuminating means mounted on said carriage for directing light rays against such zones of the subject whose images are transmitted by said first reflector means.

4. A structure as set forth in claim 1, further comprising fixed objective means disposed between said feed and said second reflector means for focussing on the photosensitive material such images which are transmitted by said second reflector means.

5. A structure as set forth in claim 1, wherein said advancing means comprises a transmission for coupling said reflector means in such a way that the speed of said second reflector means at least approximates half the speed of said first reflector means.

6. A structure as set forth in claim 5, wherein said transmission comprises a tackle.

7. A structure as set forth in claim 1, wherein said advancing means is arranged to move each of said reflector means from a starting position and further comprising return means for permanently biasing said reflector means to respective starting positions.

8. A structure as set forth in claim 7, wherein said advancing means comprises a transmission for coupling said reflector means in such a way that said second speed at least approximates half the first speed and wherein said return means comprises a spring connected with one of said reflector means.

9. A structure as set forth in claim 1, wherein said drive further comprises a rotary driver member and said advancing means includes a reel rotatable by the driver member through the intermediary of said clutch means, said advancing means further comprising an elongated flexible element having a first end connected to said first reflector means and a second end attached to said reel, said reel being arranged to take up the flexible element in response to operation of said clutch means.

10. A structure as set forth in claim 1, further comprising common guide means for said reflector means.

11. A structure as set forth in claim 1, further comprising illuminating means connected with said first reflector means for directing light rays against such zones of the subject whose images are transmitted in said first path, said illuminating means comprising two mirror symmetrical light sources.

12. A structure as set forth in claim 1, further comprising a carriage supportingly connected with said first reflector means, illuminating means mounted on said carriage for directing light rays onto such zones of the subject whose images are transmitted by said first reflector means, and diaphragm means provided on said carriage and defining an aperture through which light rays reflected on the subject pass on to said first reflector means.

13. In an optical copying apparatus, stationary supporting means for positioning a subject in a predetermined plane; first reflector means movable past the subject in substantial parallelism with said plane for transmitting images of consecutive zones of the subject in a first path which is substantially parallel to said plane; second reflector means movable in substantial parallelism with said plane for deflecting the images from said first path into a second path wherein the direction of transmission is substantially counter to that in said first path; a feed for conveying carriers of photosensitive material across the path of images transmitted by said second reflector means; and advancing means for moving said first and second reflector means in the same direction and at first and second speeds respectively, said second speed being less than said first speed, said feed comprising a drive which transmits motion to said advancing means and said drive including clutch means operative to start said advancing means in response to admission of a carrier into said feed, said clutch means comprising an electromagnetic clutch and switch means arranged to scan the carriers which are admitted to said feed, said switch means being connected in circuit with said electromagnetic clutch for actuating the same in response to detection of a carrier.

14. In an optical copying apparatus, stationary supporting means for positioning a subject in a predetermined plane; first reflector means movable past the subject in substantial parallelism with said plane for transmitting images of consecutive zones of the subject in a first path which is substantially parallel to said plane; second reflector means movable in substantial parallelism with said plane for deflecting the images from said first path into a second path wherein the direction of transmission is substantially counter to that in said first path; a feed for conveying carriers of photosensitive material across the path of images transmitted by said second reflector means; and advancing means for moving said first and second reflector means in the same direction and at first and second speeds respectively, said second speed being less than said first speed, said advancing means comprising transmission means connecting said first and second reflector means and including a pulley connected with said second reflector means, a flexible element trained around said pulley and having a first end operatively connected with said first reflector means and a second end, stationary holder means operatively connected with said second end, and adjusting means for changing the effective length of said flexible element.

15. In an optical copying apparatus, stationary supporting means for positioning a subject in a predetermined plane; first reflector means movable past the subject in substantial parallelism with said plane for transmitting images of consecutive zones of the subject in a first path which is substantially parallel to said plane; second reflector means movable in substantial parallelism with said plane for deflecting the images from said first path into a second path wherein the direction of transmission is substantially counter to that in said first path; a feed for conveying carriers of photosensitive material across the path of images transmitted by said second reflector means; and advancing means for moving said first and second reflector means in the same direction and at first and second speeds respectively, said second speed being less than said first speed, said advancing means comprising transmission means connecting said first and second reflector means and including a pulley connected with said second reflector means, a flexible element trained around said pulley and having a first end operatively connected with said first reflector means and a second end, stationary holder means operatively connected with said second end, and adjusting means for changing the effective length of said flexible element, said adjusting means comprising an eccentric connected with one end of said flexible element and movable to a plurality of angular positions to thereby change the distance between said first and second reflector means.

References Cited

UNITED STATES PATENTS

| | | | |
|---|---|---|---|
| 2,478,555 | 8/1949 | Yule | 88—24 |
| 2,487,671 | 11/1949 | Pratt et al. | 88—24 |
| 3,330,181 | 7/1967 | Jakobson | 88—24 |

NORTON ANSHER, *Primary Examiner.*

WAYNE A. SIVERTSON, *Assistant Examiner.*